K. G. DIETERICH.
LOCKING SAFETY PIN.
APPLICATION FILED JUNE 26, 1907.
1,114,737.
Patented Oct. 27, 1914.
2 SHEETS—SHEET 1.
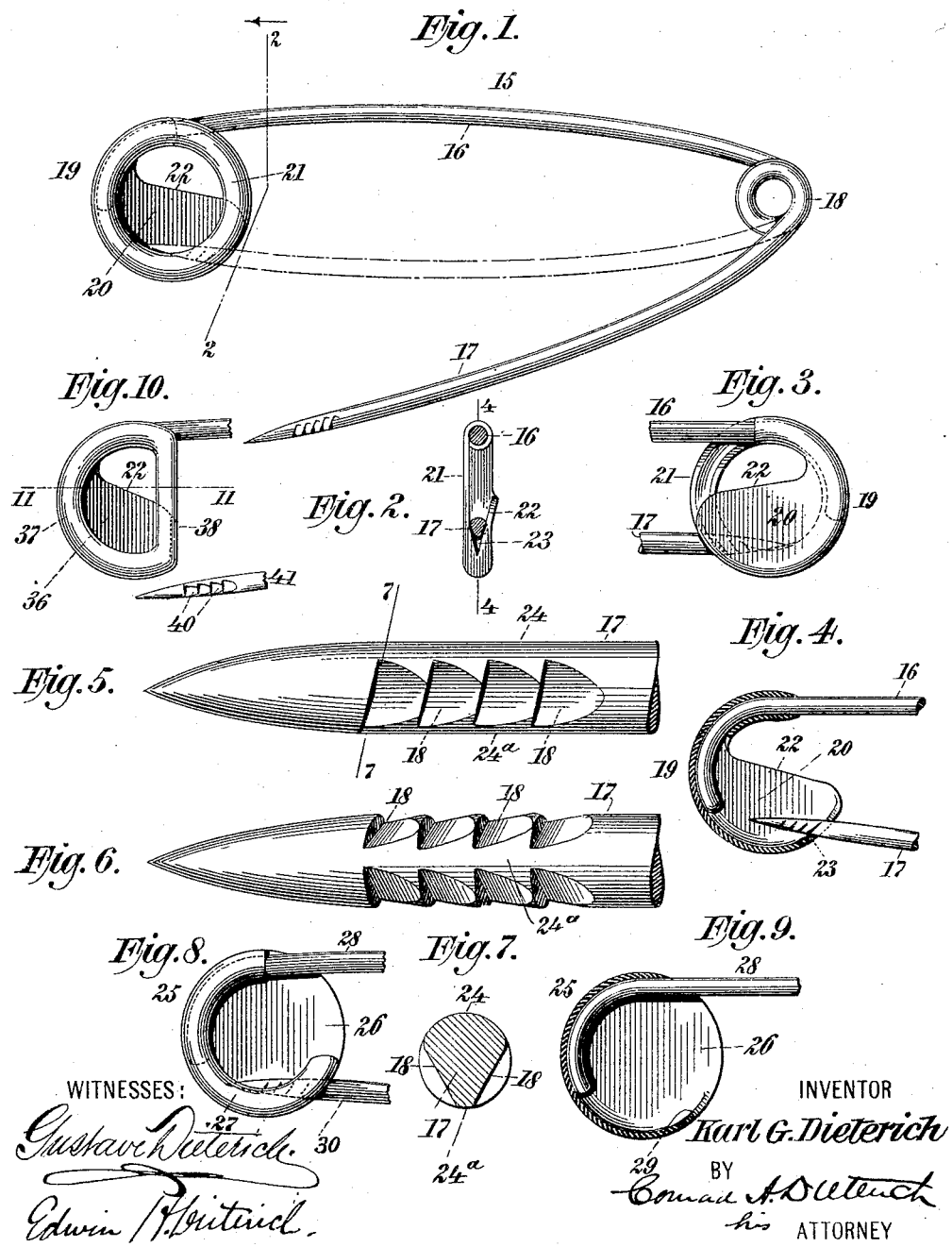

K. G. DIETERICH.
LOCKING SAFETY PIN.
APPLICATION FILED JUNE 26, 1907.
1,114,737.
Patented Oct. 27, 1914.
2 SHEETS—SHEET 2.
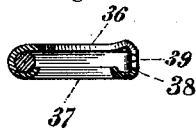
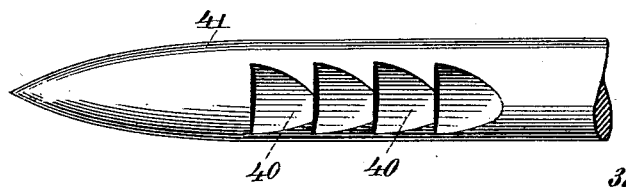
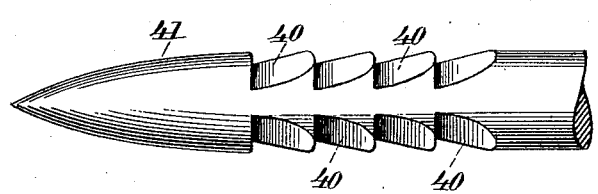
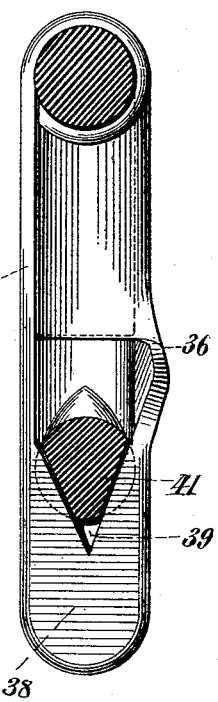
WITNESSES:
INVENTOR
Karl G. Dieterich
BY
his ATTORNEY

UNITED STATES PATENT OFFICE.

KARL G. DIETERICH, OF NEW YORK, N. Y.

LOCKING SAFETY-PIN.

1,114,737. Specification of Letters Patent. Patented Oct. 27, 1914.

Application filed June 26, 1907. Serial No. 380,847.

*To all whom it may concern:*

Be it known that I, KARL G. DIETERICH, a subject of the German Emperor, residing at the city of New York, borough of Brooklyn, Kings county, in the State of New York, have invented certain new and useful Improvements in Locking Safety-Pins, of which the following is a full, clear, and exact specification.

My invention relates generally to fastening devices, and the same has for its object more particularly to provide a neat, simple, efficient and reliable safety pin, wherein the point end of the pin may be securely locked within its cap or guard.

Further, said invention has for its object to provide a construction wherein the grooves or recesses adjacent to the point end of the pin are so constructed that the same will always conform fully to the notched portion of the cap as either the grooves or recesses in the pin or the notch in the cap wear away.

Further, said invention has for its object to provide a pin having engaging recesses so constructed and arranged therein that the same will not unduly injure the fabric when the pin is passed through the same.

Further, said invention has for its object to provide a safety pin having a cap adapted to firmly engage the point end of the pin, and maintain the same duly in position therein when locked.

To the attainment of the aforesaid objects and ends, my invention consists in the novel details of construction, and in the combination, connection and arrangement of parts hereinafter more fully described and then pointed out in the claims.

In the accompanying drawings forming part of this specification, wherein like numerals of reference indicate like parts, Figure 1 is a side view of a safety pin constructed according to and embodying my said invention, said pin being shown open in full lines, and closed in dotted lines; Fig. 2 is a transverse section of the same taken on the line 2—2 of Fig. 1 looking in the direction of the arrow; Fig. 3 is a detail side view showing the opposite side of the cap illustrated at Fig. 1; Fig. 4 is a detail section thereof taken on the line 4—4 of Fig. 2; Figs. 5 and 6 respectively are side and bottom views greatly enlarged of the point end of the pin; Fig. 7 is a transverse section of the pin taken on the line 7—7 of Fig. 5; Fig. 8 is a detail side view showing a modified form of cap; Fig. 9 is a side view of the same with the one side of the cap cut away; Fig. 10 is a detail side view showing a further modification of the cap construction; Fig. 11 is a horizontal section of the cap taken on the line 11—11 of Fig. 10; Figs. 12 and 13 respectively are side and bottom views, greatly enlarged, showing the construction and arrangement of the notches in the point end of a pin adapted for use in connection wtih the cap shown at Fig. 10, and Fig. 14 is a vertical transverse section greatly enlarged, showing the inner recessed end of the cap and the notched end of the pin in locked engagement therewith.

In said drawings, referring particularly to Figs. 1 to 7 inclusive, 15 designates a pin formed essentially of a single piece of wire, and comprising a body portion 16, a pin 17, and an integral spring 18 formed at the junction of said body portion 16 and pin 17. The free end of the body portion 16 is curved or bent in the form of a segment, and upon said bent end is secured a cap 19 consisting of a flat circular plate 20 having its edge turned inward and over to form an annular rim 21, and a portion of said plate cut at its inner edge to accommodate the curved end of the body portion 16 which is secured to said cap at the outer edge thereof intermediate the plate 20, and the annular rim 21. The cap 19 is further provided at its inner lower edge with an inclined V-shaped recess or slot 23 adapted to receive and retain the notched or grooved portion of the pin 17. The inner edge of the plate 20 adjacent to said recess or slot is flared slightly outward as shown at Fig. 2.

The construction of the pin 17 which is adapted for use with the inclined V-shaped recesses or grooves in the caps shown at Figs. 1, 2, 3, 4, 8 and 9, is best shown at Figs. 5, 6 and 7, wherein the free end of the pin is shown provided adjacent to its point end with a plurality of grooves 18, 18 which are arranged upon the under side of the pin at each side of its longitudinal center and extending downwardly forward and inward toward said center with the lower ends of the grooves of each series arranged in line with, and closely approaching the lower ends of the grooves of the series on the opposite lower side of the pin. By this arrangement of the grooves a broad smooth surface 24 is provided upon the upper surface of the pin between the upper ends of said grooves, and a relatively narrow smooth surface 24ª provided upon the underside of the pin intermediate the lower ends of the grooves of each series, thus providing a construction which may be readily passed through a piece of fabric without unduly injuring the same.

In the modification illustrated at Figs. 8 and 9, the cap 25 is also formed of a single piece of sheet metal 26 of circular outline having a rim 27 arranged along its edge for about two thirds of its circumference within which is secured the curved end of the body portion 28 of a pin, and in the lower inner edge of said rim 27 is provided an inclined V-shaped recess 29 which is adapted to receive the notched end of a pin 30.

In the construction shown at Figs. 10 and 11, the cap 35 is constructed essentially like that shown in Figs. 1, 2, 3 and 4, except that the plate 36 instead of being a true circle is cut away at its inner edge, and the rim 37 provided at its inner edge with a straight portion 38, and on the lower inner edge of said cap at the junction of the rim 37 with the plate 36 is provided a straight, vertical V-shaped recess 39, which is adapted to successively receive the grooves 40 which are arranged upon the under side of the pin 41 in the same manner as the grooves in the pin 17, except that in this construction the same have straight forward edges instead of inclined edges, as shown on an enlarged scale at Figs. 5 and 6.

In both pin constructions, as herein shown and described, the entire surfaces of each pair of oppositely-located grooves contact with the edges of the V-shaped groove in the cap, while the under side of the pin at its smooth surface is entirely free from the bottom or pointed end of said recess, thereby insuring a proper contact of the pin grooves with the edges of the recess as the said grooves or recess may become worn by repeated insertion into and removal from the cap.

As the pin becomes more and more bowed due to strain or continued use, the grooves thereof will be successively brought into engagement with the recess in the cap, and firmly locked in position therein.

Having thus described my said invention, what I claim and desire to secure by Letters Patent is:

1. A locking safety pin comprising a body portion, a cap secured thereto provided at its inner end with a tapering recess, and a pin extending from said body portion having smooth upper and lower surfaces, and forwardly inclined grooves arranged in the under side of the pin intermediate its smooth surfaces, adapted for engagement with the recess in said cap, substantially as specified.

2. A locking safety pin comprising a body portion, a cap secured thereto consisting of a plate having an annular rim, a downwardly and forwardly inclined recess in the rear edge of said cap at the junction of said plate and rim, and a pin extending from said body portion provided in its upper side with a smooth unbroken longitudinal surface, and in its under side with a relatively narrow smooth, unbroken longitudinal surface, and provided at its opposite lower sides with downwardly, inwardly and forwardly inclined grooves adapted for engagement with the recess in said cap, substantially as specified.

3. A locking safety pin comprising a body portion, a cap secured thereto consisting of a plate having an annular rim, a downwardly and forwardly inclined V-shaped recess in the rear edge of said cap, and a cut out portion in said plate merging with said V-shaped recess, and a pin provided in its under side to each side of its longitudinal center with inclined, converging recesses adapted for engagement with the V-shaped recess in said cap, substantially as specified.

Signed at the city of New York, in the county and State of New York, this twenty-second day of June, nineteen hundred and seven.

KARL G. DIETERICH.

Witnesses:
CONRAD A. DIETERICH,
A. R. ANGUS.

Copies of this patent may be obtained for five cents each, by addressing the "Commissioner of Patents, Washington, D. C."